United States Defensive Publication [19] (H) [11] T100,301

Hsieh [43] Feb. 3, 1981

[54] PHOSPHATE FLOTATION WITH DIBASIC ACIDS

[75] Inventor: Shuang-shii Hsieh, Florence, Ala.

[73] Assignee: Tennessee Valley Authority, Washington, D.C.

[21] Appl. No.: 93,354

[22] Filed: Nov. 13, 1979

[51] Int. Cl.[3] ..... B03D 1/02

[52] U.S. Cl. ..... 209/166

[57] ABSTRACT

A phosphate ore flotation proces subjects a phosphate ore containing silica and silicates to froth flotation in the presence of a collector, said collector being a $C_{36}$ high molecular weight dibasic acid comprising two carboxylic functional groups, recovering the phosphate concentrate from the overflow, and removing the separated silica and silicates in the underflow. The dibasic acids should be used in conjunction with fuel oil, not only to reduce the reagent consumption, but also to increase the grade and recovery of phosphate concentrate.

6 Claims, No Sheets Drawing,

9 Pages Specification

The file of this unexamined application may be inspected and copies thereof may be purchased (849 O.G. 1221, Apr. 9, 1968).